(12) United States Patent
Vialle

(10) Patent No.: US 8,967,532 B2
(45) Date of Patent: Mar. 3, 2015

(54) ROTARY WING AIRCRAFT PROVIDED WITH PROPULSION MEANS, AND A METHOD APPLIED BY SAID AIRCRAFT

(75) Inventor: Michel Vialle, Aix En Provence (FR)

(73) Assignee: Airbus Helicopters, Marignane Cedex (FR)

( * ) Notice: Subject to any disclaimer, the term of this patent is extended or adjusted under 35 U.S.C. 154(b) by 60 days.

(21) Appl. No.: 13/230,965

(22) Filed: Sep. 13, 2011

(65) Prior Publication Data

US 2012/0068007 A1 Mar. 22, 2012

(30) Foreign Application Priority Data

Sep. 16, 2010 (FR) ..................................... 10 03686

(51) Int. Cl.
*B64D 35/00* (2006.01)
*B64C 27/14* (2006.01)
*B64C 27/28* (2006.01)
*B64D 35/04* (2006.01)

(52) U.S. Cl.
CPC ................. *B64C 27/14* (2013.01); *B64C 27/28* (2013.01); *B64D 35/04* (2013.01)
USPC ........................................................ 244/60

(58) Field of Classification Search
USPC ................. 244/60, 53 R, 17.19, 17.21, 17.23
See application file for complete search history.

(56) References Cited

U.S. PATENT DOCUMENTS

| | | | | |
|---|---|---|---|---|
| 3,332,643 | A | * | 7/1967 | Toner ............................ 244/7 R |
| 3,782,223 | A | * | 1/1974 | Watson ......................... 74/665 L |
| 3,977,632 | A | * | 8/1976 | Watson ............................ 244/60 |
| 4,783,023 | A | * | 11/1988 | Jupe .................................. 244/6 |
| 5,108,043 | A | * | 4/1992 | Canavespe .................. 244/17.11 |
| 5,195,700 | A | * | 3/1993 | Fogler et al. ................ 244/17.21 |
| 5,782,433 | A | * | 7/1998 | Goi et al. .......................... 244/60 |
| 6,042,499 | A | * | 3/2000 | Goi et al. ......................... 475/215 |
| 7,296,767 | B2 | * | 11/2007 | Palcic et al. ................. 244/17.11 |
| 2006/0269414 | A1 | | 11/2006 | Palcic et al. |

FOREIGN PATENT DOCUMENTS

| | | |
|---|---|---|
| CN | 101495374 A | 7/2009 |
| EP | 2096333 A1 | 9/2009 |
| FR | 2670553 A1 | 6/1992 |
| FR | 2928192 A1 | 9/2009 |
| GB | 2197629 A | 5/1988 |
| WO | 2005005250 A2 | 1/2005 |
| WO | 2007086906 A2 | 8/2007 |

OTHER PUBLICATIONS

Search Report and Written Opinion; Application No. FR1003686 dated Apr. 27, 2011.
Chinese Office Action Dated Nov. 5, 2013, Application No. 201110288695.4, Applicant Eurocopter, 6 Pages.

* cited by examiner

*Primary Examiner* — Tien Dinh
*Assistant Examiner* — Keith L Dixon
(74) *Attorney, Agent, or Firm* — Brooks Kushman P.C.

(57) ABSTRACT

An aircraft (200) provided with a power plant (300) driving a rotary wing (60) and at least one propulsion means (7, 7') possessing a propeller (6, 6'), said power plant (300) including at least one engine (1, 1') having an outlet shaft (2, 2') driving a drive train (400) in order to drive said rotary wing (60). The aircraft includes one coupling member (8, 8') per engine (1, 1') provided with a drive shaft (4, 4') and with a first toothed wheel (13) that are coupled together by a clutch (15) and by a main controllable freewheel (25) arranged in parallel with the clutch, said drive shaft (4, 4') driving at least one propulsion means (7, 7') provided with brake means (9, 9') for braking its propeller (6, 6'), said first toothed wheel (13) meshing with said drive train (400).

20 Claims, 3 Drawing Sheets

ROTARY WING AIRCRAFT PROVIDED WITH PROPULSION MEANS, AND A METHOD APPLIED BY SAID AIRCRAFT

CROSS REFERENCE TO RELATED APPLICATIONS

This application claims the benefit of FR 10 03686 filed on Sep. 16, 2010, the disclosure of which is incorporated in its entirety by reference herein.

BACKGROUND OF THE INVENTION (1) Field of the Invention

The present invention relates to a rotary wing aircraft having propulsion means, and to a method applied by said aircraft.

More particularly, the invention relates to a hybrid helicopter combining, at reasonable cost, the efficiency in vertical flight of a conventional helicopter with the high travel speed performance made possible by using at least one propulsive propeller and modern engines.

(2) Description of Related Art

The hybrid helicopter comprises a fuselage with a cockpit at its front end, and a rotary wing having at least one main rotor for driving blades in rotation by means of at least one engine.

Furthermore, the hybrid helicopter is provided with at least one propulsion propeller placed on the side of the fuselage, e.g. two propulsion propellers arranged on either side of the fuselage on half-wings.

Furthermore, the hybrid helicopter is provided with an integrated drive train enabling the engine to drive the rotary wing and the propellers. By way of example, the drive train has a main power transmission gearbox upstream from each rotor of the rotary wing.

In flight, and so long as there is no failure, the speeds of rotation of the propellers and of the rotor are mutually proportional, with the proportionality ratio being constant.

Consequently, the rotary wing is continuously driven in rotation by the engine(s) and it always develops lift in flight, both in forward flight and while hovering. The hybrid helicopter is thus neither an autogyro, nor a gyrodyne, nor a compound rotorcraft, but it is a rotorcraft of another type.

Independently of the nature of the rotary wing aircraft, it is possible to provide brake means for braking the lift and propulsion assemblies, for example the propulsion propellers and the rotary wing of a hybrid helicopter.

In order to avoid damaging an engine, the engine is stopped first, and the rotary wing is braked subsequently, for example, given that the rotary wing has very high inertia.

In order to ensure that the brake acts only on the rotary wing, it is possible to arrange a freewheel downstream from the engine.

Furthermore, in the event of an engine failure, the freewheel guarantees that if the engine seizes it does not prevent the rotary wing from rotating.

By way of example, document WO 2007/086906 makes use of conventional freewheels. A conventional freewheel is usually provided with a driving portion and a drivable portion, at least one ball being arranged between an inclined ramp of the driving portion and a circular surface of the drivable portion. Thus, when the drivable portion rotates faster than the driving portion, said ball finds itself at the foot of the inclined ramp, thereby separating the drivable and driving portions. In contrast, when the driving portion is rotating faster than the drivable portion, the ball moves up towards the top of the inclined ramp and is thus wedged between the driving portion and the drivable portion. Consequently, the driving portion sets the drivable portion into rotation via said ball. The drivable and driving portions are then constrained to rotate together.

It should be observed that the balls of such a freewheel may be replaced by wheels or by rollers.

In addition to conventional freewheels, freewheels are known that are suitable for being disconnected and that are quite different from a conventional simple freewheel. A freewheel that is suitable for being disconnected operates in two distinct connection modes:

a disconnected mode in which the driving portion of the freewheel can under no circumstances set its drivable portion into movement; and a connected mode, in which the driving portion of the freewheel sets the drivable portion thereof into rotation as soon as the first speed of rotation of the driving portion becomes greater than or equal to the second speed of rotation of the drivable portion, whereas conversely said driving portion of the freewheel is not suitable for setting said drivable portion into rotation when the first speed of rotation of the driving portion is less than the second speed of rotation of the drivable portion.

It should be observed that the connected mode is sometimes referred to as "freewheel" mode, with the expressions "connected" mode and "freewheel" mode then relating to the same mode of operation.

In the connected mode, such a freewheel that is capable of being disconnected is either slipping when the first speed of rotation of the driving portion is less than the second speed of rotation of the drivable portion, or else driving when the first speed of rotation of the driving portion is greater than or equal to the second speed of rotation of the drivable portion.

Conversely, in disconnected mode, such a freewheel that is suitable for being disconnected is necessarily in slipping mode.

Reference may be made to the literature to find examples and embodiments of freewheels suitable for being disconnected. For example, in a first embodiment as described in document FR 2 670 553, the balls of a conventional freewheel are replaced by wheels arranged in a cage that can be moved along the longitudinal axis of the freewheel by means of a finger that is positioned in a helical slot in the cage.

Thus, in disconnected mode, in a first position, the wheels are not located on wedging ramps arranged on the driving portion to enable each wheel to be wedged between the driving and drivable portions, so the wheels can under no circumstances transmit motion from the driving portion to the drivable portion. In contrast, in connected mode, the wheels are located in a second position on the wedging ramps so as to be arranged between the driving and drivable portions in order to transmit motion from the driving portion to the drivable portion, where appropriate.

In contrast to conventional freewheels, the term "controllable" freewheel is used for convenience below to designate such freewheels that are suitable for being disconnected, insofar as it is possible to control their mode of operation, e.g. by moving said cage. Conversely, a conventional freewheel is referred to as a "freewheel" or as a "non-controllable" freewheel for convenience in the text below.

It should be observed that a freewheel suitable for being disconnected is sometimes referred to as a "declutchable" freewheel by the person skilled in the art. The succession of ramps on the driving portion causes a kind of dog clutch to appear between two adjacent ramps, which is why that expression is used. The term "declutchable" freewheel may thus also be used to designate such a freewheel that is suitable for being disconnected.

Furthermore, the novel concept of the hybrid helicopter can lead to a particular situation on the ground.

After landing, the pilot of a hybrid helicopter causes the engines of the aircraft to idle without stopping the rotary wing, in particular if the pilot needs to take off again shortly in order to go to some other destination.

In order to protect passengers on the ground close to the propellers, it may be appropriate to stop the propellers from rotating, while continuing to drive the rotary wing while idling.

Consequently, it is possible to provide clutching upstream from each propeller.

Although effective, that device presents drawbacks. After starting, the clutch will be subjected to high levels of torque, running the risk of causing its driving portion to slip relative to its driven portion. This gives rise to a non-negligible amount of wear.

Similarly, in flight, the risk of slip remains because of the presence of fluctuations in torque that are sometimes large.

Under such circumstances, the dimensioning of such a clutch leads to a device that is heavy and bulky and that requires frequent and burdensome maintenance operations.

SUMMARY OF THE INVENTION

An object of the present invention is thus to provide an aircraft provided with a rotary wing and at least one propulsion propeller driven by a power plant, the aircraft enabling the propeller to be stopped on the ground without requiring a heavy and bulky clutch to be used.

The technological background includes document FR 2 928 192, which describes a power transmission gearbox presenting a modifiable speed of rotation at its outlet.

Similarly, document US 2006/0269414 describes a gearbox presenting a variable speed at its outlet.

According to the invention, an aircraft is provided with a power plant driving a rotary wing and at least one propulsion means possessing a propeller, the power plant including at least one engine having an outlet shaft driving a drive train in order to drive the rotary wing, the drive train including one main freewheel per engine.

Furthermore, the aircraft is remarkable in that it includes one coupling member per engine provided with a drive shaft and with a first toothed wheel that are coupled together by a clutch and by a main controllable freewheel arranged in parallel with the clutch, the drive shaft driving at least one propulsion means provided with brake means for braking its propeller, the first toothed wheel meshing with the drive train.

Each coupling member is thus suitable for mechanically coupling the outlet shaft of the corresponding engine to its drive shaft either via its clutch and/or via its main controllable freewheel.

Each controllable freewheel then operates either in a disconnected mode in which a driving portion of the controllable freewheel can under no circumstances drive a drivable portion of the controllable freewheel, or else in a connected mode in which the driving portion drives the drivable portion as soon as a first speed of rotation of the driving portion becomes greater than or equal to a second speed of rotation of the drivable portion, whereas conversely the driving portion is not suitable for rotating the drivable portion when the first speed of rotation of the driving portion is less than the second speed of rotation of the drivable portion.

For example, the controllable freewheel comprises a driving portion having wedging ramps, a drivable portion, and a plurality of wheels arranged in a cage so as to be movable longitudinally. In the connected mode, the wheels are arranged between the driving portion of the drivable portion on the wedging ramps. In contrast, in the disconnected mode, the wheels are not arranged on the wedging ramps, but for example between the wedging ramps.

Thus, at high speed, the propeller of the propulsion means is driven by the main controllable freewheel so as not to be confronted by slip.

In contrast, when the speed of rotation of the propeller slows down, an engine drives it via the clutch. Since the speed of rotation and the driving torque of the propeller are then relatively low, there is no need to use a clutch of large size in order to avoid slip. Starting from this slow speed, it is possible to disengage and then brake the propeller. It should be observed that the rotor is not stopped during this operation, since the first toothed wheel is upstream from the clutch and from the main controllable freewheel.

The aircraft may include one or more of the following additional characteristics.

For example, the coupling member comprises:

first and second primary shafts secured to the clutch, the first primary shaft being provided with a first primary toothed wheel having a first number of teeth, and the second primary shaft being provided with a second primary toothed wheel provided with a second number of teeth, the first primary toothed wheel meshing with the second primary toothed wheel and with the drive train; and first and second secondary shafts secured to the main controllable freewheel, the first secondary shaft being provided with a first secondary toothed wheel provided with a third number of teeth meshing with the first primary toothed wheel, the second secondary shaft being provided with a second secondary toothed wheel that is provided with a fourth number of teeth meshing with the second primary toothed wheel, the drive shaft being constrained to rotate with the second secondary toothed wheel.

Furthermore, the first and second primary shafts are optionally arranged on a common axis of rotation, the first and second secondary shafts are optionally arranged on a common second axis of rotation, and the first and second main shafts may be parallel to the first and second secondary shafts.

In another aspect, the first quotient of the third number of teeth divided by the first number of teeth is greater than unity, and the product of said first quotient multiplied by a second quotient of the second number of teeth divided by the fourth number of teeth is also greater than unity.

In addition, it is possible to fit the aircraft with at least one control means for controlling the clutch and the main controllable freewheel of at least one coupling member.

Furthermore, in a first embodiment the aircraft may have a single engine.

Nevertheless, in a second embodiment, in a twin-engined aircraft, the aircraft may include at least:

a first engine having a first outlet shaft driving a first coupling member coupled to a first main drive gear of the drive train, the first main drive gear driving main interlink means via a first freewheel, the main interlink means driving a main gearbox of the rotary wing, the first coupling member acting via a first drive shaft to drive at least one propulsion means; and a second engine having a second outlet shaft driving a second coupling member coupled to a second main drive gear, the second main drive gear driving the main interlink means via a second freewheel, said second coupling member acting via a second drive shaft to drive at least one propulsion means.

In a first variant of the second embodiment, the first drive shaft and the second drive shaft drive secondary interlink means serving to set at least one propulsion means into movement, each propulsion means having a propeller and brake means.

In a second variant of the second embodiment, the aircraft includes at least:

a first drive shaft of the first coupling member driving first drive means of first propulsion means, the first drive means being mechanically connected to the main interlink means via a first secondary controllable freewheel; and a second drive shaft of said second coupling member driving second drive means of second propulsion means, the second drive means being mechanically connected to the main interlink means via a second secondary controllable freewheel.

Under such circumstances, one propeller may be braked while continuing to drive the other propeller. Each secondary controllable freewheel makes it possible to drive the associated propulsion means in the event of a failure of the corresponding engine. Each secondary controllable freewheel may include the members described above.

Optionally, a driving portion of the first secondary controllable freewheel is coupled to the main interlink means, and a drivable portion of the first secondary controllable freewheel is coupled to the first drive means, a driving portion of the second secondary controllable freewheel is coupled to the main interlink means, and a drivable portion of the second secondary controllable freewheel is coupled to the second drive means.

In addition to a device, the invention also provides a method of using the device.

The invention provides a method of braking at least one propulsion means having a propeller of an aircraft having a rotary wing, as described above, the aircraft being provided with a power plant driving a rotary wing and at least one propulsion means possessing a propeller, the power plant including at least one engine having an outlet shaft for setting into movement a drive train in order to drive the rotary wing, the drive train having one main freewheel of the non-controllable freewheel type per engine, the aircraft including a coupling member provided with a drive shaft and a first toothed wheel connected together by a clutch and by a main controllable freewheel that are arranged in parallel, the drive shaft driving at least one propulsion means provided with brake means for braking its propeller, in which method, in order to brake the propeller on the ground after a landing, with each engine driving the rotary wing via a main freewheel, the method is remarkable in that:

in an initial step, the main controllable freewheel is in connected mode for driving the propeller, the clutch being disengaged;

in a transient first step seeking to slow the speed of rotation of the propeller, the pitch of the blades of the propeller is changed so that the pitch becomes zero, and then the clutch is engaged when the propeller reaches a predetermined first speed;

in a second transient step seeking to slow the speed of rotation of the propeller, the main controllable freewheel is controlled to cause it to operate in disconnected mode; and in a braking step, the clutch is disengaged when the propeller reaches a second predetermined speed, and then the braking means of the propulsion means are activated in order to brake the propeller.

Furthermore, for the aircraft including a secondary controllable freewheel arranged between drive means of the propulsion means for braking and the drive train enabling the power plant to set the rotary wing into rotation, in an initial step, the secondary controllable freewheel being in connected mode during the initial step so that the drive train can drive the propulsion means, and in the transient second step seeking to slow the speed of rotation of the propeller, the secondary controllable freewheel may be controlled to make it operate in disconnected mode.

Furthermore, in order to accelerate the propeller after a braking step:

the braking means of the propulsion means are deactivated and then the clutch is engaged; and when the torque developed by the engine reaches a predetermined optimum torque, the main controllable freewheel is controlled to cause it to operate in connected mode, and the clutch is disengaged.

BRIEF DESCRIPTION OF THE DRAWINGS

The invention and its advantages appear in greater detail from the context of the following description of embodiments given by way of illustration and with reference to the accompanying figures, in which.

Elements that are present in more than one of the figures are given the same references in each of them.

DETAILED DESCRIPTION OF THE PREFERRED EMBODIMENTS

Figure 1:
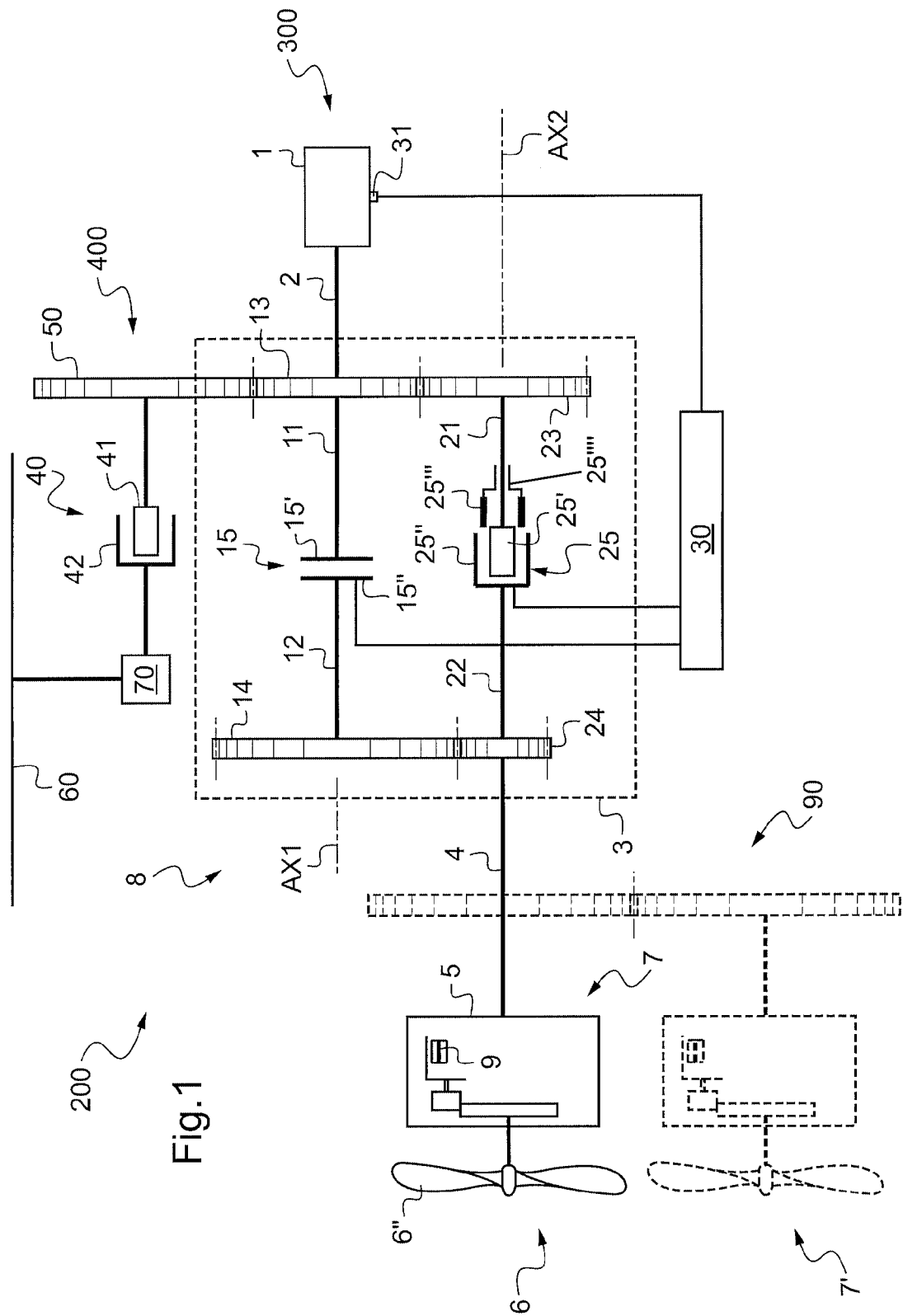
FIG. 1 is a diagram showing a first embodiment.

FIG. 1 shows an aircraft 200 having a rotary wing 60 and at least one propulsion means 7, 7', in a first embodiment.

Independently of the embodiment, the aircraft 200 includes a power plant 300 for driving a drive train 400 connected to the rotary wing 60 and for driving the or each propulsion means 7.

The power plant 300 comprises at least one engine 1 having an outlet shaft 2. The drive train 400 then optionally includes a main drive gear 50 and a main power transmission gearbox 70, a main freewheel 40 being arranged between the main drive gear 50 and the main gearbox 70 in order to allow auto-rotation of the rotary wing 60 in the event of the associated engine 1 seizing. For example, a driving member 41 of the main freewheel 40 is constrained to rotate with the main drive gear 50, while a driven member 42 of the main freewheel 40 is constrained to rotate with the main gearbox 70.

The main freewheel 40 is a conventional freewheel, i.e. an non-controllable freewheel.

Furthermore, the aircraft includes one coupling member 8 per engine 1. When the coupling member 8 is driven by the outlet shaft 2 of the corresponding engine 1, the coupling member 8 drives firstly the drive train 400 via a first toothed wheel 13 and secondly at least one propulsion means 7, 7' via a drive shaft 4.

Independently of the embodiment, the coupling member 8 includes a clutch 15 having a driving portion 15' and a driven portion 15", together with a main controllable freewheel 25 having a driving portion 25' and a drivable portion 25". It should be observed that the driving portion 15' of the clutch 15 drives said driven wheel 15" in rotation when the clutch 15 is engaged.

Similarly, the main controllable freewheel 25 has a driving portion 25' provided with wedging ramps, a drivable portion 25", connection means 25''' connecting said driving portion 25' with the drivable portion 25" and comprising a plurality of wheel type coupling means 25'''' arranged in a cage 25''''' in order to be capable of being moved longitudinally, for example.

In a disconnected mode, shown in FIG. 1, the connection means 25''' are retracted from the driving and drivable portions 25' and 25". The driving portion 25' and the drivable portion 25" are thus not constrained to rotate together during this disconnected mode, the coupling means not being arranged on the wedging ramps.

In a connected mode (not shown), the connection means 25''' are moved longitudinally so as to be arranged between the driving and drivable portions 25' and 25", the coupling means then being located on the wedging ramps. The driving portion 25' of the main controllable freewheel then sets the drivable portion 25" into rotation firstly when the freewheel is in connected mode and secondly as soon as the speed of rotation of the driving portion 25' becomes greater than or equal to the speed of rotation of the drivable portion 25".

Reference may be made to the literature in order to obtain more information about controllable freewheels, should that be necessary.

Furthermore, the coupling member 8 comprises a first primary shaft 11 and a secondary primary shaft 12 secured respectively to the driving portion 15' and to the driven portion 15" of the clutch 15.

Similarly, the coupling member 8 has a first secondary shaft 21 and a second secondary shaft 22 secured respectively to the driving portion 25' and to the drivable portion 25" of the main controllable freewheel.

The first primary shaft 11 and the second primary shaft 12 are arranged on a common axis of rotation AX1, and the first secondary shaft 21 and the second secondary shaft 22 are arranged on a common axis of rotation AX2 that is parallel to the first axis of rotation AX1.

In addition, the first primary shaft 11 is provided with a first primary toothed wheel 13 having a first number of teeth P1, and the first secondary shaft is provided with a first secondary toothed wheel 23 provided with a third number of teeth R1 meshing with the first primary toothed wheel 13. The first primary toothed wheel 13 meshes with the main drive gear 50 of the drive train 400. Nevertheless, in a variant, the first secondary toothed wheel 23 may mesh with said main drive gear 50.

In similar manner, the second primary shaft 12 is provided with a second primary toothed wheel 14 provided with a second number of teeth P2, and the second secondary shaft 22 is provided with a second secondary toothed wheel 24 provided with a fourth number of teeth R2 meshing with the second primary toothed wheel 14.

The first, second, third, and fourth numbers of teeth P1, P2, R1, and R2 are then determined using firstly a first quotient Q1 of the third number of teeth R1 divided by the first number of teeth P1, and secondly a second quotient Q2 of the second number of teeth P2 divided by the fourth number of teeth R2, i.e.:

$$Q_1 = \frac{R1}{P1}$$

$$Q_2 = \frac{P2}{R2}$$

Under such circumstances, the first and second quotients Q1 and Q2 ideally comply with the following first and second conditions:

$$Q1 > 1$$

$$Q1 \times Q2 > 1$$

where "×" represents the multiplication sign.

In addition, in order to be capable of being coupled mechanically to the drive shaft 4 by the coupling member 8, the outlet shaft 2 is fastened to the first primary toothed wheel 13 so as to be constrained to rotate therewith about the first axis of rotation AX1. Nevertheless, in a variant, the outlet shaft 2 could be fastened to the first secondary toothed wheel 23 so as to be constrained to rotate therewith about the second axis of rotation AX2.

Consequently, the drive shaft 4 is fastened to the second secondary toothed wheel 24 so as to be constrained to rotate therewith about the second axis of rotation AX2. Nevertheless, in a variant, the drive shaft could be fastened to the second primary toothed wheel 14 so as to be constrained to rotate therewith about the first axis of rotation AX1, this second primary toothed wheel 14 being capable of meshing with the drive train 40.

The aircraft may also include manual control means controlled by the pilot, or automatic control means 30, for controlling the clutch 15 and the main controllable freewheel 25. In this variant, the control means 30, such as a computer, may be connected to a sensor 31 of torque meter type, e.g. in order to determine the operating stage of the power plant.

In the first embodiment shown in FIG. 1, the power plant 300 comprises a single engine 1 driving a coupling member 8.

The drive shaft 4 of the coupling member is then connected to propulsion means 7. The propulsion means 7 may possess a transmission member 5 having brake means 9, the transmission member 5 driving a propeller 6 having blades 6".

On starting, during a first starting stage in which the engine 1 develops little torque, the outlet shaft 2 of the engine 1 then sets into rotation the first primary and secondary shafts 11 and 21 via the first and third toothed wheels 13 and 23.

With the clutch 15 being disengaged and the main controllable freewheel 25 being in disconnected mode, the second primary and secondary shafts 12 and 22 are not driven in rotation, which means that the drive shaft 4 and the propulsion means 7 remain stationary. Before being set into rotation, the blades of the propeller 6 should be at zero pitch, i.e. at a pitch at which the propellers provide no propulsive force.

In contrast, the first toothed wheel 13 drives the drive train 400.

The manufacturer defines a minimum idling speed for said engine 1, and once the engine 1 reaches its minimum idling speed and thus a first idling torque, starting enters a second stage that no longer requires a starter to be used.

Knowing that the blades of the propeller are at zero pitch, the brake means 9 of the propeller 6 are released and it is then possible to use the control means 30 to cause the clutch 15 to engage so that the driving portion 15' is in contact with the driven portion 15". The second primary shaft 12 then performs rotary motion and acts via the second and fourth toothed wheels 14 and to drive the drive shaft 4 and thus the propulsion means 5. This sets the propeller 6 into rotation.

Furthermore, the second secondary shaft 22 is also set into rotation. Nevertheless, it should be observed that the driving and drivable portions 25' and 25" of the main controllable freewheel 25 are not engaged with each other, since the main controllable freewheel 25 is disconnected.

Since the level of torque is low, a clutch 15 of reasonable dimensions suffices to operate without slip and thus to accommodate an optimum level of torque lying between a first or idling torque and a second or maximum torque developed by the engine 1. By way of example, the manufacturer determines what clutch to use and thus determines said optimum torque, as a function of the space available.

Circumstances are different when the engine 1 is developing a large amount of torque.

During a third stage of starting, when the torque developed by the engine reaches said optimum torque for said clutch, and at the beginning of a stage of stabilized operation, the main controllable freewheel 25 is controlled so as to operate in connected mode. The cage is moved along the longitudinal axis of the controllable freewheel by a finger positioned in a helical slot of the cage, so as to position the coupling means on the wedging ramps.

It should be observed that because of the numbers of teeth on the various toothed wheels 13, 14, 23, and 24, the second secondary shaft 22 and the associated drivable portion 25" of the main controllable freewheel 25 rotate more quickly than the first secondary shaft 21 and the associated driving portion 25' of the main controllable freewheel 25.

At the same time, or thereafter, the clutch 15 is disengaged so as to separate its driving portion 15' from its driven portion 15".

Consequently, the outlet shaft 2 no longer drives the drive shaft 4 in rotation during a short transient stage.

The speeds of rotation of the drive shaft 4, of the fourth toothed wheel 24, of the second secondary shaft 22, and of the drivable portion 25" then drop to become slower than the speed of rotation of the driving portion 25' of the main controllable freewheel 25.

Since the main controllable freewheel 25 is in connected mode, the driving portion 25' of said main controllable freewheel 25 then sets into rotation the drivable portion 25" of the main controllable freewheel 25. Thus, the outlet shaft 2 sets the drive shaft 4 into motion successively via the first toothed wheel 13, the third toothed wheel 23, the first secondary shaft 21, the main controllable freewheel 25, the second secondary shaft 22, and the fourth toothed wheel 23.

Conversely, when the aircraft lands temporarily on the ground, it is advantageous to stop only the rotation of the propeller 6.

In the invention, in order to brake at least one propulsion means 7 after landing, it can be understood that during an initial step the main controllable freewheel 25 of the corresponding coupling member is in connected mode in order to drive the propeller 6 of the propulsion means 4, the clutch 15 of said coupling member being disengaged.

During a first transient step seeking to slow the speed of rotation of the propeller 6, the pitch of the blades 6" of the propeller 6 is modified so as to become zero, and then the clutch 15 is engaged when the propeller 6 reaches a first predetermined speed. More precisely, the control means 30 cause the clutch 15 to engage as a function of information concerning the speed of the propeller coming from sensors (not shown), or indeed from the sensor 31 of the engine 1, for example.

During a second transient step seeking to slow the speed of rotation of the propeller, the main controllable freewheel 25 is controlled to make it operate in disconnected mode. The cage of the main controllable freewheel 25 is thus moved to take the coupling means away from the wedging ramps.

Under such circumstances, during a braking step, the clutch is disengaged when the propeller 6 reaches a second predetermined speed, and then the braking means 9 of the propulsion means 7 are activated to brake the propeller 6.

Furthermore, in order to accelerate the propeller after a temporary landing, the brake means 9 of the propeller 6 are deactivated and the control means 30 can then be used to engage the clutch 15 so that the driving portion 15' comes into contact with the driven portion 15". The second primary shaft 12 then rotates and acts via the second and fourth toothed wheels 14 and to drive the drive shaft 4 and thus the propulsion means 5. This sets the propeller 6 into rotation.

Furthermore, the second secondary shaft 22 is also set into rotation. Nevertheless, it should be observed that the driving and drivable portions 25' and 25" of the main controllable freewheel 25 are not in mutual engagement, since the main controllable freewheel 25 is disconnected.

When the torque developed by the engine reaches a predetermined optimum torque, the main controllable freewheel 25 is controlled so as to operate in connected mode.

At the same time, or in succession, the clutch is disengaged so as to separate its driving portion 15' from its driven portion 15".

In accordance with the variant shown in dotted lines, the aircraft may have a plurality of propulsion means 7, 7', the drive shaft 4 then setting into motion interlink means connected to the set of propulsion means 7, 7'.

Figure 2:
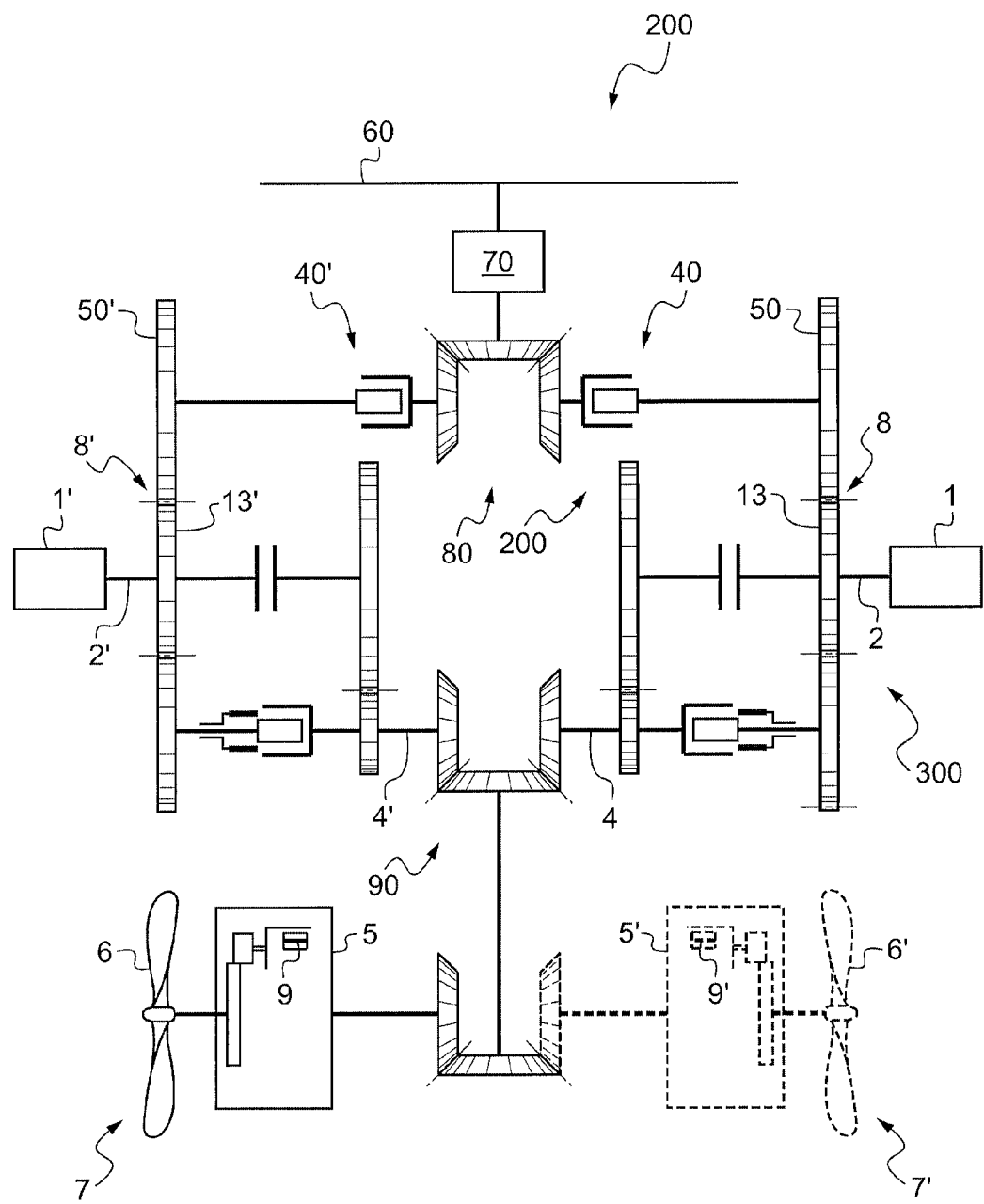
FIG. 2 is a diagram showing a first variant of a second embodiment.
Figure 3:
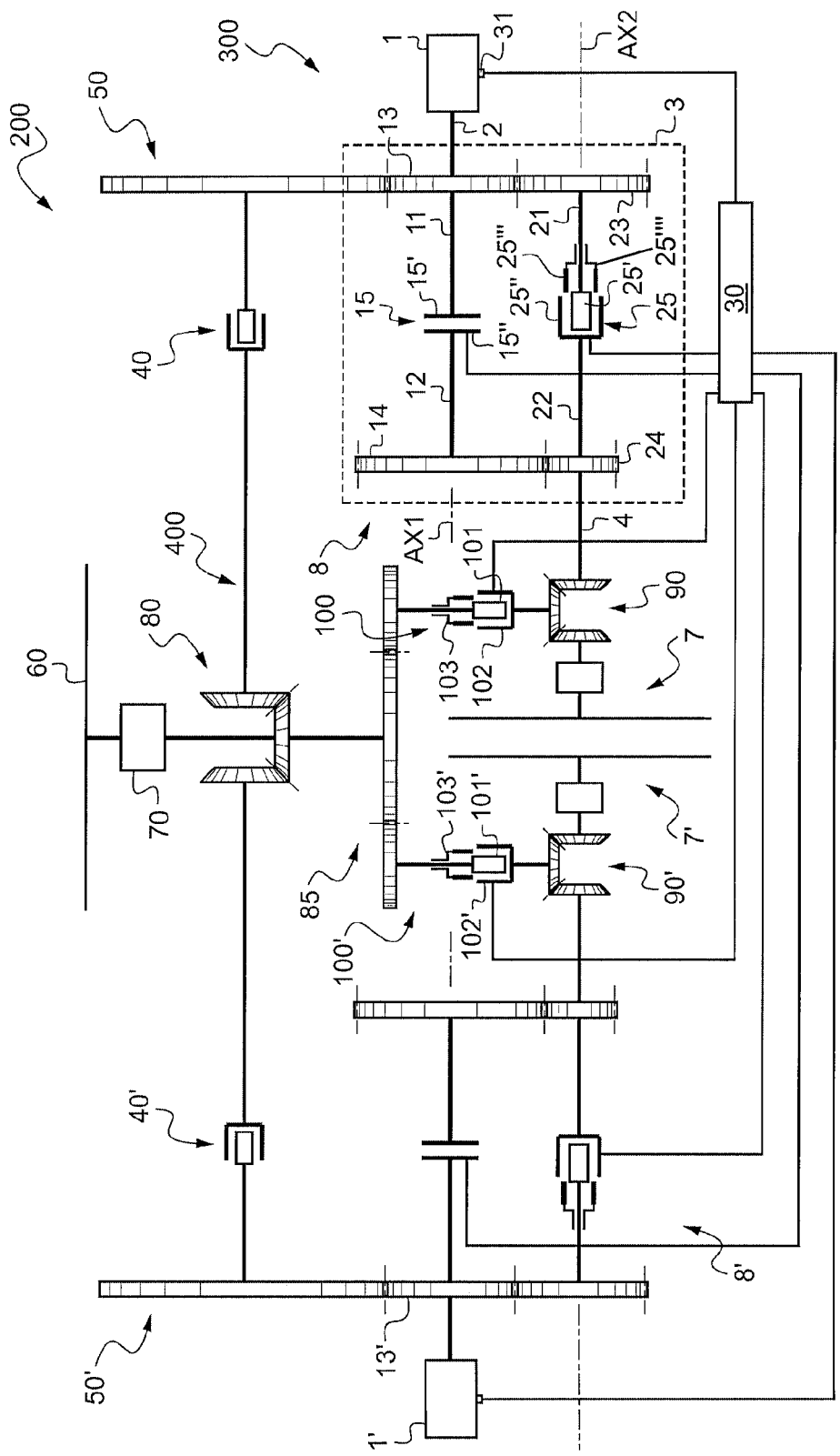
FIG. 3 is a diagram showing a second variant of a second embodiment.

With reference to FIGS. 2 and 3, in a second embodiment, the power plant 300 includes at least a first engine 1 and a second engine 1' each co-operating with a respective coupling member 8, 8'.

The aircraft then has a first engine 1 with a first outlet shaft 2 driving a first coupling member 8 coupled to a first main drive gear 50 of the drive train 400. This first main drive gear 50 drives main interlink means 80 via a first freewheel 40, the interlink means 80 setting into motion a main gearbox 70 of the rotary wing 60. In addition, the first coupling member 8 acts via a first drive shaft 4 to drive at least one propulsion means 7.

Similarly, the aircraft also includes a second engine 1' having a second outlet shaft 2' driving a second coupling member 8' coupled to a second main drive gear 50' of the drive train 400. This second main drive gear 50' drives the main interlink means 80 via a second freewheel 40'. In addition, the second coupling member 8' acts via a second drive shaft 4 to drive at least one propulsion means 7.

In the first variant of the second embodiment as shown in FIG. 2, the set of engines 1, 1' acts together to drive the set of propulsion means 7, 7'.

Thus, the first drive shaft 4 and the second drive shaft 4' put the secondary interlink means 90 into motion, driving at least one propulsion means 7, 7'.

In contrast, in the second variant of the second embodiment as shown in FIG. 3, each engine 1, 1' drives respective propulsion means 7, 7'. Thus, it is possible to stop a single propulsion means on the ground.

In this second variant, it is possible also to provide one secondary controllable freewheel per propulsion means so that each engine can drive all of the propulsion means, should that be necessary.

Under such circumstances, the aircraft includes for example a first drive shaft 4 of the first coupling member 8 that drives a first drive means 90 of a first propulsion means 7, the first drive means 90 being mechanically connected to the second main interlink means 80 via a first secondary controllable freewheel 100.

A driving portion 101 of the first secondary controllable freewheel 100 is consequently coupled to the main interlink means 80 and a drivable portion 102 of the first secondary controllable freewheel 100 is coupled to the first drive means 90.

Similarly, a second drive shaft 4' of the second coupling member drives a second drive means 90' of a second propulsion means 7', the second drive means 90' being mechanically connected to said main interlink means 80 by a second secondary controllable freewheel 100'.

A driving portion 101' of the second secondary controllable freewheel 100' is consequently coupled to the main interlink means 80 and a drivable portion 102' of the second secondary controllable freewheel 100' is coupled to the second drive means 90'.

The secondary controllable freewheels 100 and 101' are then in connected mode in flight so that either engine can back up the other in the event of failure.

In contrast, in order to brake the propeller of the corresponding propulsion means, during a second transient step seeking to slow the speed of rotation of the propeller, the secondary controllable freewheel is disengaged to cause it to operate in disconnected mode.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft provided with a power plant driving a rotary wing and at least one propulsion means possessing a propeller, said power plant including at least one engine having an outlet shaft driving a drive train in order to drive said rotary wing, said drive train including one main freewheel per engine, wherein the aircraft includes one coupling member per engine provided with a drive shaft and with a first toothed wheel that are coupled together by a clutch and by a main controllable freewheel arranged in parallel with the clutch, said drive shaft driving at least one propulsion means provided with brake means for braking and stopping its propeller, said first toothed wheel meshing with said drive train, said main controllable freewheel having a driving portion and a drivable portion, wherein the driving portion of the main controllable freewheel can under no circumstances drive the drivable portion of said main controllable freewheel in a disconnected mode of the main controllable freewheel, and wherein the driving portion drives the drivable portion as soon as a first speed of rotation of the driving portion becomes greater than or equal to a second speed of rotation of the drivable portion in a connected mode of the main controllable freewheel, wherein the driving portion does not rotate said drivable portion when the first speed of rotation is less than the second speed of rotation in the connected mode of the main controllable freewheel.

2. An aircraft according to claim 1, wherein said coupling member comprises:
   first and second primary shafts secured to said clutch, said first primary shaft being connected to the first toothed wheel having a first number of teeth (P1), and said second primary shaft being provided with a second primary toothed wheel provided with a second number of teeth (P2); and
   first and second secondary shafts secured to said main controllable freewheel, said first secondary shaft being provided with a first secondary toothed wheel provided with a third number of teeth (R1) meshing with said first toothed wheel, said second secondary shaft being provided with a second secondary toothed wheel that is provided with a fourth number of teeth (R2) meshing with said second primary toothed wheel, said drive shaft being constrained to rotate with said second secondary toothed wheel.

3. An aircraft according to claim 2, wherein said first and second primary shafts are arranged on a common axis of rotation (AX1), said first and second secondary shafts are arranged on a common second axis of rotation (AX2), and said first and second main shafts are parallel to said first and second secondary shafts.

4. An aircraft according to claim 2, wherein a first quotient (Q1) of the third number of teeth (R1) divided by the first number of teeth (P1) is greater than unity, and a product of said first quotient (Q1) multiplied by a second quotient (Q2) of the second number of teeth (P2) divided by the fourth number of teeth (R2) is also greater than unity.

5. An aircraft according to claim 1, including at least one control means for controlling said clutch and said main controllable freewheel.

6. An aircraft according to claim 1, including at least:
   a first engine having a first outlet shaft driving a first coupling member coupled to a first main drive gear of said drive train, said first main drive gear driving main interlink means via a first freewheel, the main interlink means driving a main gearbox of said rotary wing, said first coupling member acting via a first drive shaft to drive at least one propulsion means; and
   a second engine having a second outlet shaft driving a second coupling member coupled to a second main drive gear, said second main drive gear driving said main interlink means via a second freewheel, said second coupling member acting via a second drive shaft to drive at least one propulsion means.

7. An aircraft according to claim 6, wherein said first drive shaft and said second drive shaft drive secondary interlink means serving to set at least one propulsion means into movement, each propulsion means having a propeller and brake means.

8. An aircraft according to claim 6, including at least:
   a first drive shaft of said first coupling member driving first drive means of first propulsion means, the first drive means being mechanically connected to said main interlink means via a first secondary controllable freewheel; and
   a second drive shaft of said second coupling member driving second drive means of second propulsion means, the second drive means being mechanically connected to said main interlink means via a second secondary controllable freewheel.

9. An aircraft according to claim 8, wherein a driving portion of said first secondary controllable freewheel is coupled to said main interlink means, and a drivable portion of said first secondary controllable freewheel is coupled to the first drive means, a driving portion of said second secondary controllable freewheel is coupled to said main interlink means, and a drivable portion of said second secondary controllable freewheel is coupled to the second drive means.

10. An aircraft according to claim 1 wherein the brake means are positioned between the drive shaft and the propeller, the brake means configured to be operated in conjunction with the clutch to set the propeller into motion and bring the propeller to rest.

11. An aircraft according to claim 1 wherein when the main controllable freewheel is in the disconnected mode, the driving portion of the main controllable freewheel is unable to drive the drivable portion of said main controllable freewheel independent of the relative speeds of the driving and drivable portions of the main controllable freewheel.

12. A method of braking at least one propulsion means having a propeller of an aircraft having a rotary wing, the aircraft being provided with a power plant driving a rotary wing and at least one propulsion means possessing a propeller, said power plant including at least one engine having an outlet shaft for setting into movement a drive train in order to drive said rotary wing, said drive train having one main freewheel per engine, said aircraft including a coupling member provided with a drive shaft and a first toothed wheel connected together by a clutch and by a main controllable freewheel that are arranged in parallel, the main controllable freewheel having a driving portion and a drivable portion, said drive shaft driving at least one propulsion means provided with brake means for braking and stopping its propeller, in which method, in order to brake said propeller on the ground after a landing, the following steps are performed:

in an initial step, said main controllable freewheel is in a connected mode for driving said propeller, said clutch being disengaged, the driving portion of the main controllable freewheel driving a drivable portion of the main controllable freewheel in the connected mode when a first speed of rotation of the driving portion becomes greater than or equal to a second speed of rotation of the drivable portion;

in a transient first step seeking to slow the speed of rotation of the propeller, the pitch of the blades of said propeller is changed so that said pitch becomes zero, and then said clutch is engaged when said propeller reaches a predetermined first speed, said main controllable freewheel in the connected mode;

in a second transient step seeking to slow the speed of rotation of the propeller, said main controllable freewheel is disconnected and in a disconnected mode, the driving portion of the main controllable freewheel under no circumstances driving the drivable portion of said main controllable freewheel in the disconnected mode; and in a braking step, said clutch is disengaged when said propeller reaches a second predetermined speed, and then the braking means of the propulsion means are activated in order to brake and stop the propeller.

13. A method according to claim 12, wherein for said aircraft including a secondary controllable freewheel arranged between drive means of the propulsion means for braking and the drive train enabling the power plant to set said rotary wing into rotation, in an initial step, said secondary controllable freewheel, being in connected mode during the initial step so that said drive train can drive said propulsion means, and in the transient second step seeking to slow the speed of rotation of the propeller, said secondary controllable freewheel is disengaged to make it operate in disconnected mode.

14. A method according to claim 12, wherein in order to accelerate said propeller after a braking step:
the braking means are deactivated and then said clutch is engaged; and
when the torque developed by said engine reaches a predetermined optimum torque, the main controllable freewheel is controlled to cause it to operate in connected mode, and said clutch is disengaged.

15. A hybrid helicopter comprising:
a rotary wing;
a propulsion unit comprising a first propeller and a brake for braking and stopping the first propeller;
a power plant driving the rotary wing and the propeller, the power plant including an engine having an outlet shaft;
a drive train driving the rotary wing and having a main drive gear driven by the outlet shaft of the engine, the drive train including a main freewheel positioned between the main gear and the rotary wing; and
a coupling member driven by the engine and comprising:
a first primary toothed wheel driven by the outlet shaft of the engine and in meshed engagement with the main drive gear,
a drive shaft driving the propulsion unit,
a clutch coupling the first primary toothed wheel and the drive shaft, the clutch having an engaged position and a disengaged position, and
a controllable freewheel coupling the first primary toothed wheel and the drive shaft and arranged in parallel with the clutch, wherein the controllable freewheel comprises a driving portion and a drivable portion;
wherein the driving portion of the controllable freewheel is physically decoupled from the drivable portion of the controllable freewheel in a disconnected mode of the controllable freewheel such that the driving portion under no circumstances drives the drivable portion;
wherein the driving portion is physically coupled to the drivable portion in a connected mode of the controllable freewheel such that the driving portion drives the drivable portion when a first speed of rotation of the driving portion becomes greater than or equal to a second speed of rotation of the drivable portion.

16. The hybrid helicopter of claim 15 wherein the controllable freewheel and clutch of the coupling member are disconnected such that the propeller is stationary when the engine is operated to drive the rotary wing via the outlet shaft, main drive gear, and main freewheel.

17. The hybrid helicopter of claim 15, wherein the coupling member further comprises:
first and second primary shafts secured to the clutch, the first primary shaft connected to the first primary toothed wheel having a first number of teeth (P1), and the second primary shaft connected to a second primary toothed wheel provided with a second number of teeth (P2); and
first and second secondary shafts secured to said controllable freewheel, said first secondary shaft connected to a first secondary toothed wheel provided with a third number of teeth (R1), and said second secondary shaft connected to a second secondary toothed wheel provided with a fourth number of teeth (R2);
wherein the first primary toothed wheel is meshed with the first secondary toothed wheel;
wherein the second primary toothed wheel is meshed with the second secondary toothed wheel; and
wherein the drive shaft is connected to the second secondary toothed wheel for rotation therewith.

18. The hybrid helicopter of claim 17 wherein the outlet shaft of the engine is connected to the first primary toothed wheel; and
wherein the first primary toothed wheel, the main drive gear of the drive train, and the first secondary toothed wheel form a gear train.

19. The hybrid helicopter of claim 17, wherein when the controllable freewheel is connected, the outlet shaft drives the rotary wing and the propeller, the outlet shaft driving the rotary wing via the first primary toothed wheel, the main drive gear, and the main freewheel in sequential order, and the outlet shaft drives the propeller through the first primary toothed wheel, the first secondary wheel, the controllable freewheel, the second secondary toothed wheel, and the drive shaft in sequential order when a speed of rotation of the first secondary shaft is greater than a speed of rotation of the second secondary shaft.

20. The hybrid helicopter of claim 15 wherein the controllable freewheel further comprises a cage adapted to move between a first position and a second position, wherein the cage couples the driving portion and the drivable portion in the first position by a plurality of wheel type couplers cooperating with wedging ramps provided on the driving portion, and decouples the driving portion and the drivable portion in the second position by retracting from the driving and drivable portions such that the driving and drivable portions are mechanically disconnected.

* * * * *